United States Patent [19]

Jacobsen

[11] Patent Number: 4,509,832
[45] Date of Patent: Apr. 9, 1985

[54] OPTICAL ARRANGEMENT FOR PRODUCING TWO ANAMORPHOTICALLY COMPRESSED IMAGES CORRELATED BY AN INTEROCULAR BASE DISTANCE

[75] Inventor: Jan Jacobsen, Reutern, Fed. Rep. of Germany

[73] Assignee: Walter Meier, Birmensdorf, Switzerland

[21] Appl. No.: 403,662

[22] PCT Filed: Dec. 2, 1981

[86] PCT No.: PCT/CH81/00135
§ 371 Date: Jul. 26, 1982
§ 102(e) Date: Jul. 26, 1982

[87] PCT Pub. No.: WO82/02098
PCT Pub. Date: Jun. 24, 1982

[30] Foreign Application Priority Data

Dec. 8, 1980 [CH] Switzerland ............ 9041/80

[51] Int. Cl.³ .................................................. G02B 13/10
[52] U.S. Cl. ................................................... 350/420
[58] Field of Search .................. 350/464, 420, 421

[56] References Cited

U.S. PATENT DOCUMENTS

| 2,595,409 | 5/1952 | Reijnders | 88/16.6 |
| 2,832,262 | 4/1958 | Cook | 350/464 |
| 3,425,775 | 2/1969 | Jacobsen | 352/57 |
| 4,205,894 | 6/1980 | Filipovich et al. | 350/35 |

FOREIGN PATENT DOCUMENTS 2557471 6/1977 Fed. Rep. of Germany .
282078 2/1929 United Kingdom .

Primary Examiner—John K. Corbin
Assistant Examiner—Rebecca D. Gass
Attorney, Agent, or Firm—Roylance, Abrams, Berdo & Goodman

[57] ABSTRACT

An optical arrangement for producing two anamorphotic images correlated by a interocular base distance, includes two basic optical systems and two afocal anamorphotic systems. The basic optical systems are parallel and spaced laterally by an interocular base distance. Each anamorphotic system has a cylindrical negative lens system mounted adjacent the object space side of the respective basic optical system and a cylindrical positive lens system mounted adjacent the image space side of the respective basic optical system.

17 Claims, 3 Drawing Figures

OPTICAL ARRANGEMENT FOR PRODUCING TWO ANAMORPHOTICALLY COMPRESSED IMAGES CORRELATED BY AN INTEROCULAR BASE DISTANCE

FIELD OF THE INVENTION

The present invention relates to optical imaging and to an arrangement of optical elements for producing pairwise, interocular-correlated, anamorphotically linearly compressed images. The arrangement is particularly useful for the exposure of film material suitable for the horizontally expanded reproduction of images retained on film in this way, particularly on a double-curved projection plane as true stereophotographic images.

BACKGROUND OF THE INVENTION

When showing films, attempts have frequently been made to give the viewer the impression that he was part of the photographically represented events. Numerous technical solutions have been proposed in view of the attractiveness of a close to reality representation of a generally optically dramatic sequence, such as objects flying towards the viewer, precipitous journeys, etc. These sequences lead to many different reactions on the part of the viewer.

U.S. Pat. No. 4,129,365 describes a wide-angle projection arrangement (Cinerama) in which three projectors project on to a cylindrically curved projection surface a picture formed from three images giving the viewer a panoramic effect. Through the use of a special type of flexible mirror, projection can take place without the viewers seeing the projectors, which projectors are disturbingly positioned below and somewhat in front of the viewers. The necessary transverse magnification of the partial images is produced with anamophotically acting optical means. However, the apparatus cost is considerable for three cameras and two reflecting mirrors for each camera. Special measures are also required to produce an uninterrupted transition between the partial images.

The apparatus expenditure is considerably reduced by the projection arrangement described in U.S. Pat. No. 4,154,514 to Harvey. An image is produced on a projection plane deeply curved in arc-like manner on one side giving the viewer the impression of spatial or three-dimensional action. Projection takes place over an angle between 138° and 153° onto a cylindrically curved plane. Compared with conventional 3D-systems, using an angle of normally less than 90°, no additional optical viewing aid is required for producing the three-dimensional impression.

The projection arrangement described in the Harvey patent merely comprises a single projector with anamophotic aids positioned in front of it to produce the necessary very large width/height ratio. Standard 35 mm films with anamorphic images are used for projection purposes.

The optical three-dimensional effect is largely based on the deep curvature of the projection plane, which plane surrounds the viewer of the photographic scene or occupies the viewer's field of the vision such that the picture frame is no longer perceived. Thus, a picture, as perceived by the two eyes with the given interocular distance, is processed by the brain to give a three-dimensional impression.

Another technical solution involves two anamorphotically compressed images correlated with respect to one another with an interocular distance and represented on a standard 70 mm film in a ratio of 1:2. During projection, there is a stereo wide-screen picture effect with two pictures correlated in the interocular distance and defined by different polarization. A viewing aid is provided in the form of a viewer with two polarizers inclined towards one another.

For recording the images two basic optic systems are connected in front of anamorphic attachments, and their optical axes are essentially spaced the average spacing of a pair of human eyes. Since the centre-to-centre spacing of the image on the film is determined by the image format and is generally much smaller than the spacing of the optical axes, the represented object distances are adapted in known manner by reflecting mirrors.

As a function of the conventional anamorphic attachment/basic optics combination, relatively large overall lengths are required, so that the camera angle is limited. The convergence control of the two correlated images is also more difficult for extreme wide-angle projection. The incident light beams of the two optics must be transversely displaced with respect to the optical axes and at the same time focused as soon as the taking distance changes.

SUMMARY OF THE INVENTION

An object of the present invention is to provide an optical arrangement for taking wide-angle stereo pictures using simultaneous anamorphotic compression having a particularly simple optical arrangement, a small overall length and few movable parts.

Another object of the present invention is to provide an optical arrangement having a compact, anamorphotic stereo image block to simultaneously perform convergence control and focusing by the same optical element.

The foregoing objects are obtained by an optical arrangement for producing two anamorphotic images correlated by a interocular base distance, comprising two basic optical systems and two afocal anamorphotic systems. The basic optical systems are spaced laterally by an interocular base distance. Each anamorphotic system has a cylindrical negative lens system mounted adjacent the object space side of the respective basic optical system and a cylindrical positive lens system mounted adjacent the image space side of the respective basic optical system.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF PREFERRED EMBODIMENTS

Figure 1:
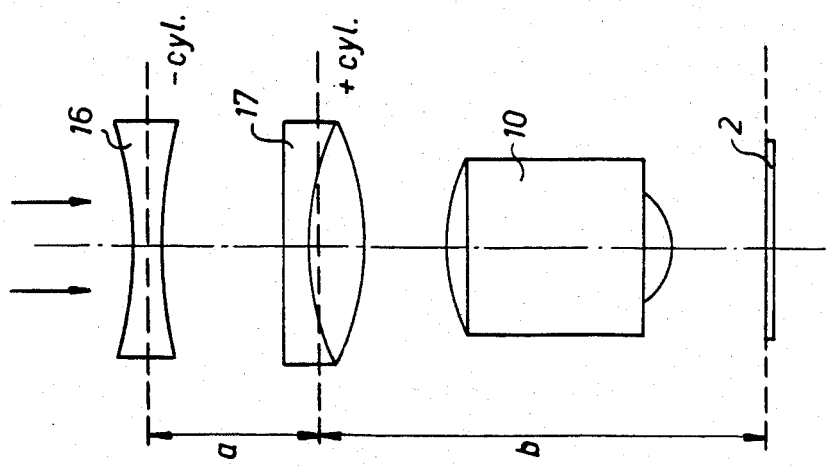
FIG. 1 is a diagramatic side elevational view of an optical arrangement according to the prior art.

FIG. 1 essentially shows an optical arrangement with a basic optical system or basic optics 10 and a cylindrical anamorphotic attachment arranged on the object space side of basic optical system 10. This upstream-mounted anamorphotic attachment comprises a plurality of elements including cylindrically ground lenses spaced by a distance a. A negative cylindrical front lens 16 or a cylindrically ground dispersion lens, and a positive cylindrical lens 17 or a cylindrically ground collective lens are provided. Along the optical path, basic optical system 10 follows and normally corresponds to conventional camera optics. By correspondingly dimensioning the anamorphotic attachment, the attachment is optically adapted to the camera optics. The total length from front lens 16 to the plane of film 2 is a+b, and can vary considerably as a function of the optical design.

On the film plane this arrangement forms, in the horizontal image direction, an image of the taken object compressed, e.g., by a factor of 2 or double.

Two such arrangements must be used for stereoscopic recording with their optical center or principal axes parallel and at a distance of approximately 70 mm. The distance is the average interocular distance or base distance.

Unless preference is given to the taking of the stereo images with two separate cameras, the interocular base distance must be linearly transformed to a distance defined by the film format used as one of the many boundary conditions. For extreme wide-angle photographs with a sensible light intensity, a base distance of approximately 70 mm for the optical axes of two lenses is closer to the lower limit. Thus, the selection of the anamorphotic attachments causes serious dimensioning problems.

In addition, the wide-angle characteristics of the basic optics are impaired by the overall length of the anamorphotic attachment. The necessary distance in front of the attachment is such that the desire wide-angle projection cannot be realized on the photographic recording side.

Figure 2:
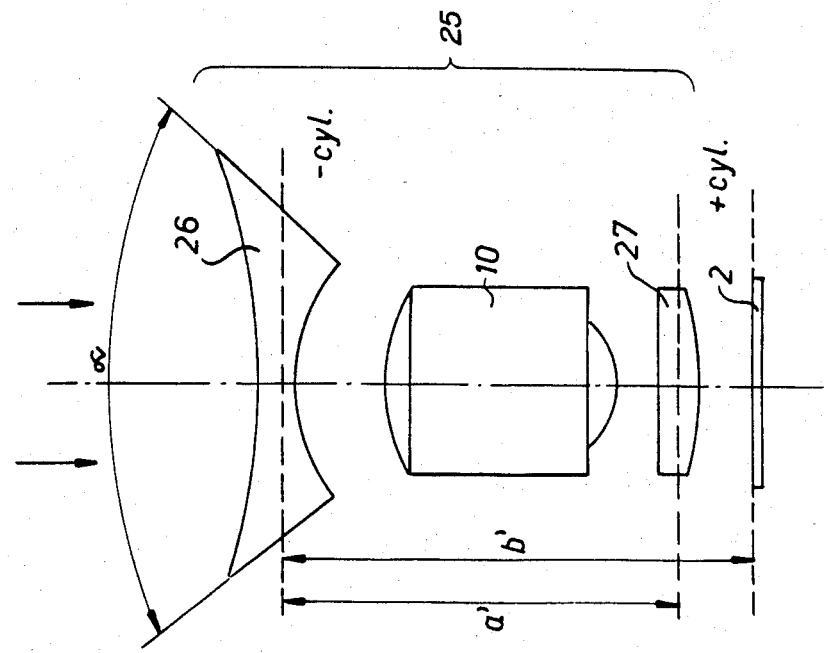
FIG. 2 is a diagramatic side elevational view of an optical arrangement according to a first embodiment of the present invention.

FIG. 2 shows an arrangement of optical elements where, according to the present invention, a more compact construction with a better or more complete utilization of the wide-angle characteristics of the basic optical system is provided. The multi-element cylindrical anamorphotic attachment 25 is functionally separated with basic optical system or basic optics 10 arranged within the scope of distance a'. The novel anamorphotic block comprises a negative cylindrical lens 26, i.e., a cylindrically ground dispersion lens, arranged on the object space side of basic optical system 10, followed by the basic optics which can be located very close to the dispersion lens 26 as a result of this measure. Following along the optical path, a positive cylindrical lens 27, i.e., a cylindrically ground collective lens, is located in front of the film plane 2 on the image space side of the basic optical system.

This functional nesting of the basic optical system and the anamorphotic system provides a much shorter overall length, because the space between the two cylindrical lenses is virtually completely used. The angle α, for suitably selected basic optics, is at least 100°, providing marked improvement of the wide-angle characteristics due to the novel anamorphotic attachment 25. The nesting in a' and the telescoping of the overall lengths provide a total length b' smaller than (a+b). In this arrangement, the object imaging on the film plane is focused by the displacement of the complete optical part 25.

Figure 3:
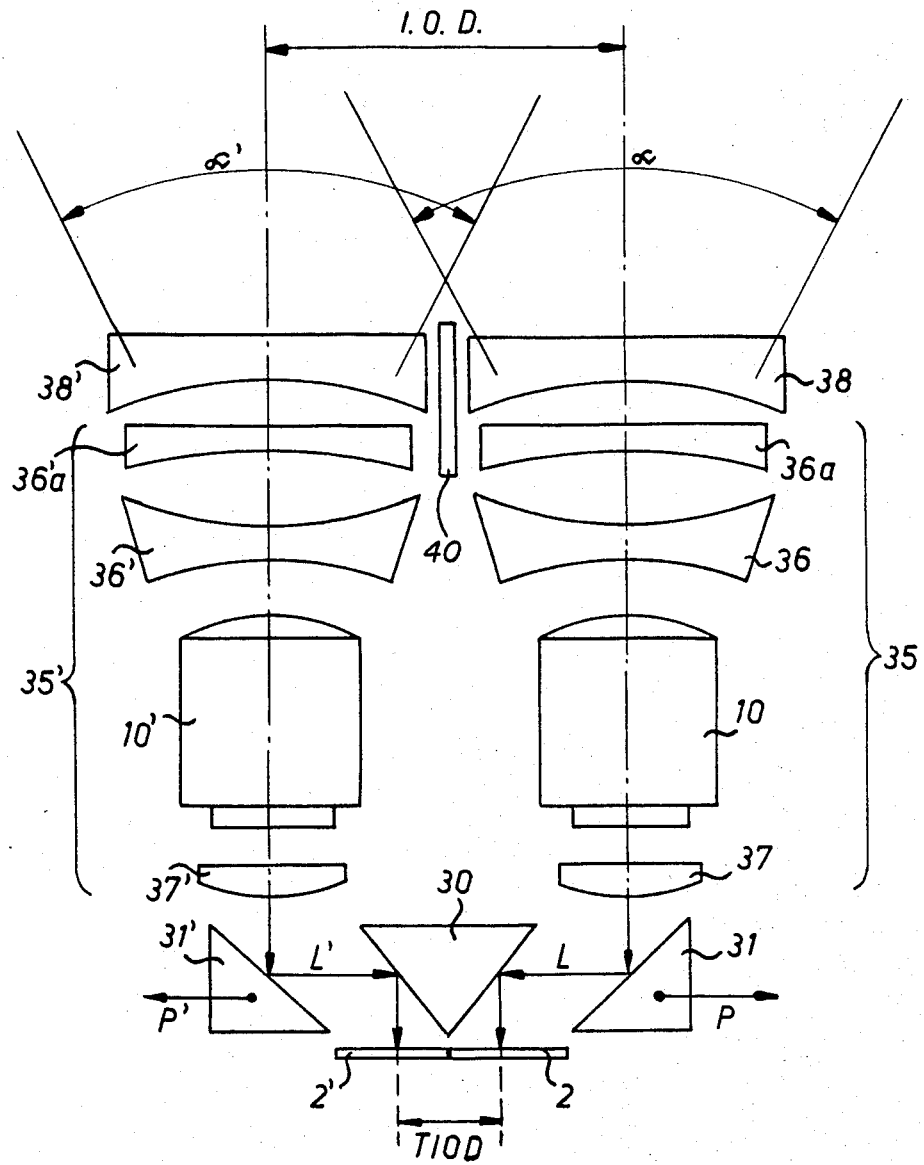
FIG. 3 is a diagramatic side elevational view of an optical arrangement according to a second embodiment of the present invention, providing a complete anamorphotic stereo image block.

The short overall length obtained permits significantly smaller front lens diameters or a constant light intensity. Two parallel optical systems, as illustrated in FIG. 2, are used to form an anamorphotic block suitable for stereo photography. Such an optical arrangement is illustrated in FIG. 3.

For each basic optics 10 and 10', negative cylindrically ground lens elements 36 and 36a or 36' and 36'a are provided on the object space side. A spherical negative achromat serves as the front lens 38 or 38' for further shortening the focal length. This leads to a further increase of the taking angle α, which consequently considerably exceeds 100°.

The optical and geometrical dimensioning of the front lenses 38 and 38' can be selected such that, for a predetermined spacing of the central axes at the interocular distance or I.O.D., the peripheral portions of the lenses are brought towards one another to such an extent that the optical separating element 40 between the two systems has a thickness of, e.g., 1 mm.

On the image space side, each basic optics 10 or 10' is followed by a positive cylindrically ground lens element 37 or 37'.

In the optical elements covered by arrangement 35, the desired anamorphotic compression, e.g., of 1:2, is accomplished and the focal length in the horizontal plane is halved. The upstream dispersion lenses 38 and 38' increase the taking angle.

The parallel incident light beams in the I.O.D. spacing pass through the two optical systems and pass out of the cylindrical lenses 37 and 37'. The two resulting anamorphotically compressed images correspond to a left image and a right image, which are what the eyes perceive of an object. The two interocular-correlated images must then be represented in juxtaposed manner on the film plane without further optical change.

The symmetrical deflection of the L/R-images takes place by means of a system of prisms 30, 31, 31'. The prisms are silvered on the optically active surfaces. Prism 30 is arranged over the film plane and is stationary. Prisms 31 and 31' are positioned behind the individual anamorphotic systems 35 and 35', and are displaceable in opposite directions. Arrows L, L' show the path of light beams from the anamorphotic attachments to the film plane. The film plane is subdivided into two areas 2 and 2' with one of the two L/R-images represented in each area. The image centres have the reduced spacing TIOD corresponding to a linear-transformed interocular distance.

The silvered prisms, which can be replaced by corresponding mirrors, are dimensioned and arranged such that the desired deflection is obtained and the overall length is minimized. Two deflections by 90° is particularly favorable.

In wide-angle photographs possible by this optical arrangement, there are considerable convergence variations in the close range, which variations must be correspondingly compensated. A parallel displacement of the image rays is necessary to restore the variable spacing (TIOD) of the associated image points on the film plane. This is accomplished by an oppositely directed displacement of the two prisms 31 and 31' positioned behind the anamorphotic attachments. The oppositely directed displacement is indicated by the two oppositely directed arrows P, P'.

During displacement of the two prisms toward one another, the two parallel, associated rays move apart in the film plane. During movement of the prisms away from one another, the associated image points in the L/R-areas of the film plane move towards one another. The convergence for any taking distance can be restored in this simple way.

Simultaneously with these oppositely directed displacements of the two prisms 31, 31' and as a function of the prism positions, the image rays L, L' emanating from lenses 37, 37' follow longer or shorter paths to the film plane 2 or 2'. With an appropriate choice of basic optics 10, 10', this image space-side lengthening or shortening of the light path simultaneously provides the necessary focusing of the image on changing the taking distance. This prism arrangement and the oppositely directed displacement of two prisms with respect to a stationary prism permits a single manipulation to simultaneously correct the divergence and the focusing. In addition, the two prisms 31, 31' are the only moving optical parts in this arrangement. Thus, all the setting and adjusting functions when taking a photograph are carried out with a minimum of movable parts.

Advantageously, the movement of the prisms is brought about by a relatively solid rod with end bearings and with two oppositely directed threads. A manipulating member for turning the threaded rod is provided on one end of the threaded rod outside the bearings. The calibration of the regulating member is carried out in known manner.

The optical arrangement of the present invention permits extreme wide-angle photographs to be taken for stereo projection with camera constructions of previously unknown compactness. This is also noteworthy from the weight standpoint. On the basis of the presently described system, hand-held cameras can be constructed, which are easy to manipulate and require only the simplest operating manipulations. This system is also suitable for all film sizes, the downward limitation only being the available film surface.

While various embodiments have been chose to illustrate the invention, it will be understood by those skilled in the art that various changes and modifications can be made therein without departing from the scope of the invention as defined in the appended claims.

I claim:
1. An optical arrangement for producing two anamorphotic images correlated by an interocular base distance, comprising:
   first and second basic optical systems spaced laterally by an interocular base distance, each of said basic optical systems having an object space side and an image space side; and
   first and second afocal anamorphotic systems mounted adjacent said first and second basic optical systems, respectively, each of said anamorphotic systems having a cylindrical negative lens system on the object space side of the respective basic optical system and a cylindrical positive lens system on the image space side of the respective basic optical system.
2. An optical arrangement according to claim 1 wherein reflecting mirror means are mounted downstream of said positive lens systems for reducing spacing of the two anamorphotic images.
3. An optical arrangement according to claim 2 wherein said reflecting mirror means comprises first and second reflecting mirrors arranged on principal optical axes of said first and second basic optical systems, respectively, said first and second reflecting mirrors being relatively movable in directions orthogonal to said principal optical axes.
4. An optical arrangement according to claim 3 wherein said reflecting mirror means comprise third and fourth reflecting mirrors fixed relative to said principal axes and receiving light reflected from said first and second reflecting mirrors.
5. An optical arrangement according to claim 2 wherein said reflecting mirror means comprise a pair of reflecting mirrors fixed relative to principal optical axes of said first and second basic optical systems and arranged in a reflected light beam.
6. An optical arrangement according to claim 5 wherein said reflecting mirrors comprise surface-silvered, 90° reflecting prisms.
7. An optical arrangement according to claim 4 wherein said reflecting mirrors comprise surface-silvered, 90° reflecting prisms.
8. An optical arrangement according to claim 3 wherein said reflecting mirrors comprise surface-silvered, 90° reflecting prisms.
9. An optical arrangement according to claim 2 wherein said reflecting mirror means includes reflecting mirrors comprising surface-silvered, 90° reflecting prisms.
10. An optical arrangement according to claim 9 wherein each of said reflecting mirrors are oriented at an angle of about 45° relative to said principal optical axes.
11. An optical arrangement according to claim 8 wherein each of said reflecting mirrors are oriented at an angle of about 45° relative to said principal optical axes.
12. An optical arrangement according to claim 7 wherein each of said reflecting mirrors are oriented at an angle of about 45° relative to said principal optical axes.
13. An optical arrangement according to claim 6 wherein each of said reflecting mirrors are oriented at an angle of about 45° relative to said principal optical axes.
14. An optical arrangement according to claim 5 wherein each of said reflecting mirrors are oriented at an angle of about 45° relative to said principal optical axes.
15. An optical arrangement according to claim 4 wherein each of said reflecting mirrors are oriented at an angle of about 45° relative to said principal optical axes.
16. An optical arrangement according to claim 3 wherein each of said reflecting mirrors are oriented at an angle of about 45° relative to said principal optical axes.
17. An optical arrangement according to claim 2 wherein said reflecting mirror means comprises reflecting mirrors oreinted at angles of about 45° relative to optical axes of said first and second basic optical systems.

* * * * *